US010334516B1

United States Patent
Zhang et al.

(10) Patent No.: US 10,334,516 B1
(45) Date of Patent: Jun. 25, 2019

(54) CELL SEARCH IN A WIRELESS NETWORK

(71) Applicant: Hong Kong Applied Science and Technology Research Institute Co., Ltd., Shatin, New Territories (HK)

(72) Inventors: Zhonghui Zhang, Fanling (HK); Xiangyu Liu, Shatin (HK); Yuxian Zhang, Fanling (HK); Man Wai Kwan, Shatin (HK); Kong Chau Tsang, Kln (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 15/920,026

(22) Filed: Mar. 13, 2018

(51) Int. Cl.
  *H04W 48/16* (2009.01)
  *H04B 17/318* (2015.01)
  *H04W 56/00* (2009.01)

(52) U.S. Cl.
  CPC .......... *H04W 48/16* (2013.01); *H04B 17/318* (2015.01); *H04W 56/001* (2013.01)

(58) Field of Classification Search
  CPC ... H04W 24/10; H04W 48/16; H04W 56/001; H04W 36/0083; H04W 16/14; H04W 56/0025; H04W 72/04; H04W 84/045; H04W 8/005; H04B 17/309; H04B 17/318; H04J 11/0079; H04J 2211/005
  See application file for complete search history.

(56) References Cited

U.S. PATENT DOCUMENTS

| | | | |
|---|---|---|---|
| 9,432,922 B1 | 8/2016 | Song et al. | |
| 9,763,177 B1 * | 9/2017 | Baskaran | H04W 48/16 |
| 9,820,272 B1 * | 11/2017 | Parvazi | H04J 11/0069 |
| 10,051,586 B2 * | 8/2018 | Park | H04W 56/002 |

(Continued)

FOREIGN PATENT DOCUMENTS

| | | | |
|---|---|---|---|
| CN | 102377712 A | 3/2012 | |
| CN | 102510566 A * | 6/2012 | H04W 24/00 |

(Continued)

OTHER PUBLICATIONS

International Search Report and Written Opinion issued for PCT Application No. PCT/CN2018/079349, dated Dec. 3, 2018; 9 pages.

(Continued)

*Primary Examiner* — Allahyar Kasraian
(74) *Attorney, Agent, or Firm* — Norton Rose Fulbright US LLP

(57) ABSTRACT

The present disclosure relates to methods, devices, and systems for cell identification. For example, the systems, devices, and methods described herein may be used to detecting a secondary synchronization signal (SSS) index. In an aspect of the present disclosure, a method includes detecting, at an electronic device, a first SSS index based on a comparison between a first power value and a first threshold. The first power value is associated with a correlation power result between a received signal from a base station and a local SSS. The method also include determining, at the electronic device, a second threshold based on the first power value, and performing a comparison between a second power value and the second threshold. The second power value is determined based on the received signal.

28 Claims, 6 Drawing Sheets

(56) References Cited

U.S. PATENT DOCUMENTS

| | | | |
|---|---|---|---|
| 2013/0122822 A1* | 5/2013 | Srinivasan | H04J 11/0073 |
| | | | 455/67.13 |
| 2014/0078961 A1 | 3/2014 | Shen et al. | |
| 2017/0164345 A1* | 6/2017 | Goto | H04J 11/00 |
| 2018/0049082 A1* | 2/2018 | Kinthada Venkata | ........................ |
| | | | H04W 24/10 |
| 2018/0309495 A1* | 10/2018 | Xiong | H04J 11/00 |

FOREIGN PATENT DOCUMENTS

| | | |
|---|---|---|
| CN | 102572970 A | 7/2012 |
| CN | 103581069 A | 2/2014 |
| CN | 106603189 A | 4/2017 |
| CN | 107370699 A | 11/2017 |
| EP | 2461502 A1 | 6/2012 |

OTHER PUBLICATIONS

Zhou, Y. et al. "Non-ideal SSS Coherent Detection in 3GPP LTE System," ICCSEE, 2013, 4 pages.
Kim, J.-I. et al. "SSS Detection Method for Initial Cell Search in 3GPP LTE FDD/TDD Dual Mode Receiver," 9th International Symposium on Communications and Information Technology, 2009, pp. 199-203, 5 pages.
Morelli, M. et al. "A Robust Scheme for PSS Detection and Integer Frequency Offset Recovery in LTE Systems," IEEE, 2015, 10 pages.
Seminar. Ausgewählte Kapitel der Nachrichtentechnik, WS 2009/ 2010. LTE: Der Mobilfunk der Zukunft. Synchronization and Cell Search. Fabian Schuh, 11 pages.

\* cited by examiner

CELL SEARCH IN A WIRELESS NETWORK

TECHNICAL FIELD

The present disclosure is generally related to cell identification, and more particularly to improvements for cell search operations in a wireless network.

BACKGROUND

A cellular network can include one or more base stations that each provide wireless coverage for a particular geographic area referred to as a cell. As demand for data capacity increases in cellular networks, additional cells are established to add data capacity. These additional cells can be relatively small cells as compared to larger cells, such as macro cells. Additionally, a small cell (e.g., a base station) can be deployed in a variety of locations by an end user or operator with little to no radio frequency (RF) planning unlike a macro cell which is typically installed after substantial network planning with site-specific configuration settings.

A base station added to a network may have self-configuration capabilities that enable the base station to select a physical cell identifier (PCI) that identifies the base station within the network. The PCI may be derived from a primary synchronization signal (PSS) sequence index and a secondary synchronization signal (SSS) sequence index. The PCI should be selected to avoid PCI collisions which occur when two neighboring base stations with overlapping coverage areas share the same PCI. For example, when two base stations with overlapping coverage areas have the same PCI, a user equipment (UE) in the overlapping coverage areas may be unable to distinguish between signals received from the two base stations. The inability to distinguish between the signals received from the two base stations can cause the UE to experience loss of processing gain, synchronization issues, and high decoding errors.

Both base station and UE perform cell search operations (e.g., sniffing operations) to identify PCIs of one or more neighboring base stations (e.g., one or more neighboring cells). The UE may perform cell search operations to identify one or more neighboring base stations to communicate with, such as a base station with a strongest signal for the UE to perform a hand off operation. A base station, such as a new base station associated with a small cell, may identify one or more neighbors to select one or more configuration settings, such as a PCI. As compared to the cell search operations performed by the UE, the base station wants to search other base stations that may be far away and/or that are associated with a very weak signal received by the base station that performs the cell search operations. Base stations that are far away and/or that are associated with a weak receive signal may be difficult to detect because of interference (e.g., competing signals) from base stations that are closer and/or that are associated with stronger signals receive by the base station that performs the cell search operations.

Cell search operations are intended to identify cell IDs while having a miss detection rate (e.g., a rate of not detecting a PCI) that is low and a false alarm rate (e.g., a rate of detecting a PCI that is not actually broadcast) that is low. To identify PCI values, a combination of PSS detection operations and SSS operations may be used. The PSS detection operation identifies a PSS index and the SSS operation identifies a SSS index. Each of the PSS and SSS detections operations may include identifying a value in a corresponding signal (e.g., a PSS or a SSS) and comparing the value to respective PSS threshold or SSS threshold. The thresholds are often predetermined values. If a particular threshold is too high, a false alarm rate may be low but a miss detection rate may be high and PCIs may not be detected. If a particular threshold is too low, a miss detection rate may be low but a false alarm rate may be high. In techniques that use a predetermined threshold and that implement successive interference cancellation, a probability of a false alarm increases with each successive interference cancellation because, as identified signal components are identified and removed, the remaining signals (including noise signals) become more pronounced and are more likely as being identified as a PSS or a SSS. Additionally, techniques that implement successive interference cancellation can be time consuming and computational complex as a PSS index and a corresponding SSS index are detected and followed by performance of successive interference cancellation prior to performing a next detection operation.

SUMMARY

The present disclosure is generally related to systems, devices, and methods that perform cell identification, such as cell search operations in a wireless network. For example, the systems, devices, and methods described herein may be used to perform SSS detection using a dynamically updatable threshold. To illustrate, a SSS threshold used for SSS detection may be updated according to previous normalized correlation power peak value and previous threshold. Use of the updated SSS threshold during SSS detection operations that include successive interference cancellation (SIC) may maintain a low false alarm rate throughout the SIC operations. The systems, devices, and methods described herein may also be configured to perform multiple SSS detection operations responsive to detection of a PSS index. To illustrate, in response to detection of the PSS index, a SSS SIC loop may perform one or more detection iterations. For each detected SSS index, a SIC operation is performed to cancel a corresponding SSS component from a received signal prior to performing a next SSS detection iteration. A PSS component corresponding to the detected PSS index is not canceled from the received signal until the SSS SIC loop is finished. By executing the SSS SIC loop prior to cancelling the PSS component, a computational complexity of performing a cell search operation is reduced as compared to conventional techniques that cancel a PSS component and a SSS component in response to identification of a PSS index and a corresponding SSS index.

The present disclosure advantageously performs operations associated with a cell search in a manner that has a low miss detection rate and a low false alarm rate. For example, dynamically updating a SSS threshold enables a false alarm rate to be low during multiple iterations of a SSS detection loop. Additionally, or alternatively, the present disclosure beneficially has a lower computational complexity and/or more efficient performance than conventional cell search techniques that implement SIC operations. To illustrate, cell search operations according to the present disclosure may detect multiple SSS indices for an identified PSS index without having to perform PSS cancelation and/or PSS detection between SSS detection operations (associated with the PSS index).

In an aspect of the present disclosure, a method for detecting a secondary synchronization signal (SSS) index includes detecting, at an electronic device, a first SSS index based on a comparison between a first power value and a first threshold. The first power value may be associated with a correlation power result between a received signal from a base station and a local SSS. For example, the first power value may include a maximum peak power of the correlation power result. The method further includes determining, at the electronic device, a second threshold based on the first power value. The method also includes performing a comparison between a second power value and the second threshold, where the second power value is determined based on the received signal.

In another aspect of the present disclosure, a method for a secondary synchronization signal (SSS) index includes performing a primary synchronization signal (PSS) detection operation on the received signal to generate a first PSS detection result associated with a first PSS index. The method also includes, after detection of the first SSS index, canceling a SSS component associated with the SSS index from the received signal to generate a first modified received signal. The method further includes, after performance of a SSS detection operation on the first modified received signal, canceling a PSS component associated with the first PSS index from the received signal to generate a second modified received signal.

The foregoing has outlined rather broadly the features and technical advantages of the present disclosure in order that the detailed description that follows may be better understood. Additional features and advantages will be described hereinafter which form the subject of the claims. It should be appreciated by those skilled in the art that the conception and specific examples disclosed may be readily utilized as a basis for modifying or designing other structures for carrying out the same purposes described herein. It should also be realized by those skilled in the art that such equivalent constructions do not depart from the spirit and scope of the disclosure as set forth in the appended claims. The aspects which are characterized herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWING

For a more complete understanding of the present invention, reference is now made to the following descriptions taken in conjunction with the accompanying drawing, in which.

DETAILED DESCRIPTION

Particular implementations of the present disclosure are described below with reference to the drawings. In the description, common features are designated by common reference numbers throughout the drawings. As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of a described implementation.

Figure 1:
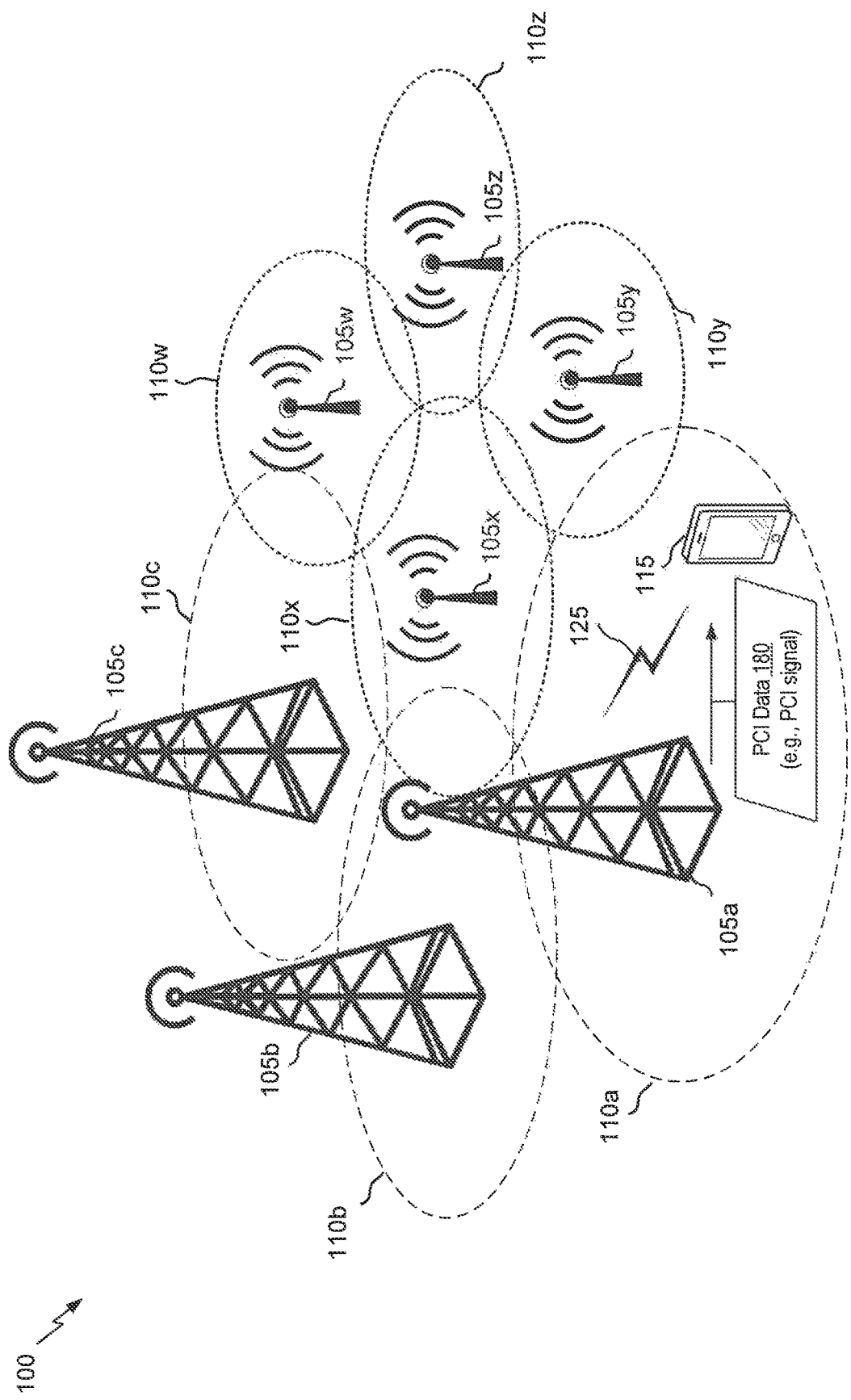
FIG. 1 is a block diagram illustrating an example of a wireless communication system that includes aspects of the present disclosure.

FIG. 1 shows a system 100, such as a wireless network, that is configured for communication according to aspects of the present disclosure. The aspects described herein may be implemented in one or more types of networks, such as an LTE network, a fifth generation (5G) network, a peer-to-peer network, or another type of network.

System 100 includes base stations 105 and one or more user equipments (UEs) 115. The base stations 105 may be communicatively coupled a UE and may be able to communicate via an uplink channel and/or a donwlink channel. Each base station (e.g., 105) may be associated with a corresponding "cell" 110, such as a physical region associated with a range of wireless communication supported by the base station. One or more UEs 115 may be dispersed throughout system 100. Although referred to as a user equipment (UE), the UE may include one or more electronic devices, such as a mobile device, a wireless device, a smart phone, etc. In FIG. 1, wireless transmissions between a serving base station 105a and UE 115 is indicated by bolt 125. In some implementation, communication between two base stations may include wired or wireless communication.

As shown, base stations 105a, 105b and 105c are macro base stations for the macro cells 110a, 110b and 110c, respectively. Base stations 105w, 105x, 105y, and 105z are small cell base stations, which may include pico or femto base stations that provide service to small cells 110w, 110x, 110y, and 110z, respectively. In some implementations of system 100, the small cell 110w, 110x, 110y, 110z 4G/5G networks enhance system capacity by massive spectral reuse. In such an example, the base stations 105w, 105x, 105y, 105z of the small cells should be self-configured and self-optimize regularly in self-organizing networks (SON). In addition, intercell interference coordination (ICIC) technology may be implemented to reduce the interference level at cell edges (e.g., cell boundaries). In some implementations of system 100, a neighbor relation table may be constructed and/or distributed to one or more base stations 105 to store information related to neighbor cells. Additionally, or alternatively, a small cell 110w, 110x, 110y, 110z can be deployed by an end user or an operator in a variety of locations places with minimal or no RF coordination planning. To illustrate, unlike a macro network, the small cell can be installed by subscribers without any network planning and site-specific system configuration settings. Such devices are typically "plug-n-play" devices with self-configuration capabilities and/or are able to respond when turned on and continue to adapt to a changing environment. Due to the dynamic nature of a network environment, effective PCI search approaches, such as those described herein, are implemented by one or more base stations and/or by one or more UEs.

Each cell (e.g., base station 105) has a physical cell identity (PCI) to avoid collision and confusion with its neighbors To illustrate, PCI is a primary configuration parameter for a cell and aids in differentiating the signal of one cell from that of another. The PCI of a particular cell (e.g., a particular base station) has a one-to-one mapping with the cell's synchronization signals; reference signals (RS) and their pseudorandom position in frequency, as well as with the scrambling codes for most of the physical channels.

The PCI of each fixed station is combined by two signals, a primary synchronization signal (PSS) and a secondary synchronization signal (SSS). As an example, in an LTE network there are three different PSS indexes (e.g., 0, 1, 2), also known as NID2. And there are 168 SSS indexes (e.g., 0-167), also known as NID1. To derive a PCI of a cell, a cell search operation is performed to detect the PSS sequence and SSS sequence index to derive the PCI according to the equation: PCI=3(SSS index)+PSS index. To illustrate:

$$0 \quad \ldots \quad 167 \quad \leftrightarrow \quad PSS\ \text{index}(NID2) \in \{0, 1, 2\}$$

$$\overline{0\ 1\ 2} \quad \ldots \quad \overline{0\ 1\ 2} \quad \leftrightarrow \quad SSS\ \text{index}(NID1) \in \{0, 1, \ldots, 167\}$$

where PSS is a primary synchronization signal, SSS is a secondary synchronization signal, and PCI=3×SSS index+ PSS index. Thus, there are 504 unique PCIs grouped into 168 unique physical-layer cell identity groups (PLIGs, NID1), each group having three unique physical-layer cell identities (PLIs, NID2). A cell's PCI is thus the combination of the Cell's PLIG and its PLI. As an illustrative, non-limiting example, base station 105a may transmit its PCI as PCI data 180 (e.g., a PCI signal including a PSS signal and a SSS signal) to one or more UEs (e.g., 115) and/or more or more other base stations (e.g., 105).

PCI collision occurs when two neighboring cells with overlapping coverage area share the same PCI. PCI collision can be a serious problem as UEs in that overlapping area cannot distinguish between the signals coming from the two cells, causing loss of processing gain, synchronization issues, and high decoding errors. In some implementations of system 100, a cell transmits (e.g., every 5 ms) two synchronization signals—the primary synchronization signal (PSS) and the secondary synchronization signal (SSS). Therefore, a device, such as a UE or a base station, may perform a cell search operation to detect PSS index and SSS index to derive the PCI.

In a particular implementation of system 100, base station 105a transmits PCI data 180 (e.g., two synchronization signals—the primary synchronization signal (PSS) and the secondary synchronization signal (SSS)). An electronic device, such as another base station 105 or UE 115, may perform a cell search operation to receive PCI data 180 and to detect the PCI of base station 105a. An example of a configuration and operation of such an electronic device is described herein with reference to at least FIG. 2. For example, base station 105z may perform a cell search operation to detect the PCI of base station 105a.

Figure 2:
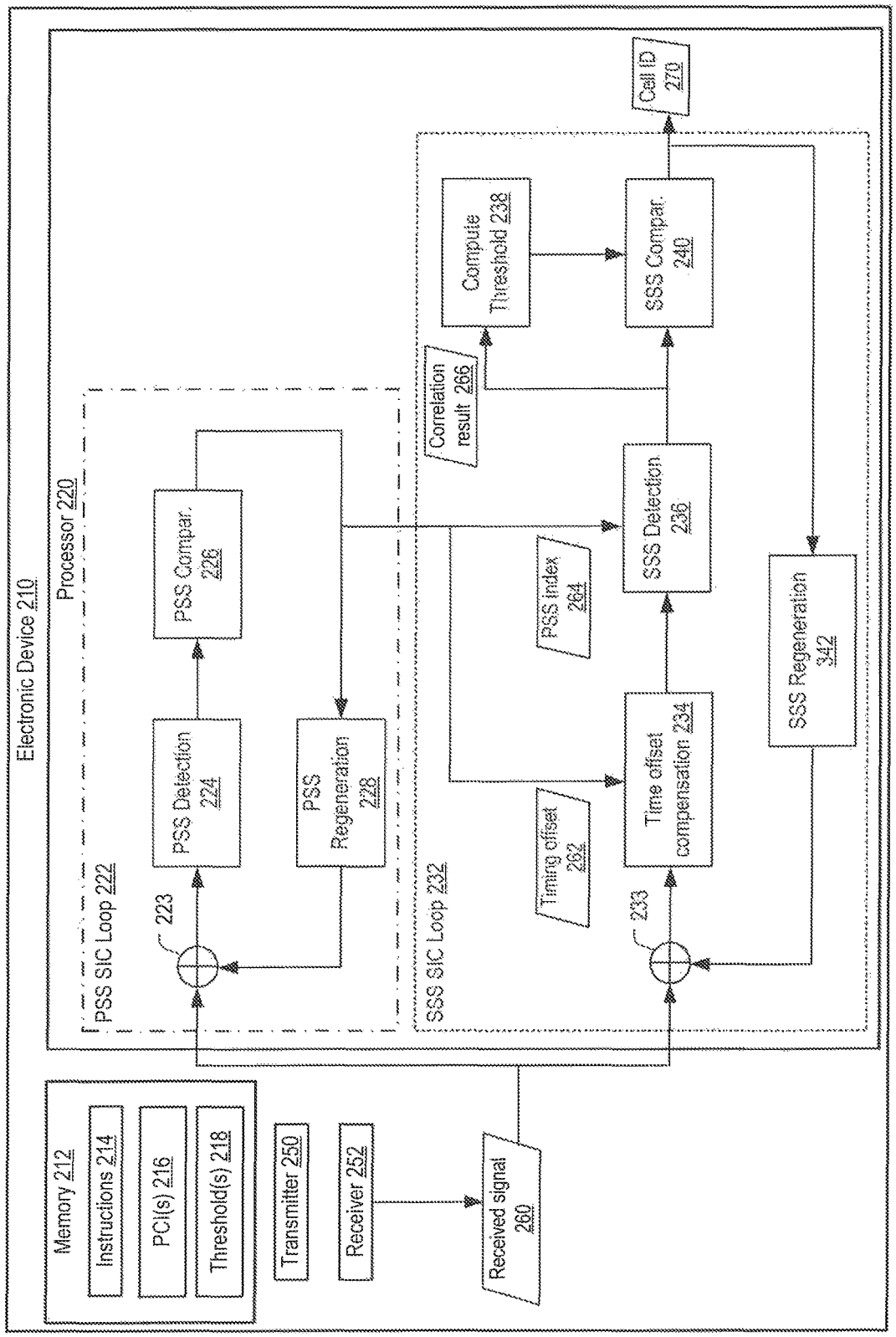
FIG. 2 is a block diagram of an example of an electronic device configured to determine a physical cell identifier (PCI) information.

Referring to FIG. 2, a block diagram of an example of an electronic device 210 is shown. Electronic device 210 may include a base station or UE. For example, electronic device 210 may include or correspond to include base station 105a, 105b, 105c, 105w, 105x, 105y, 105z or UE 115.

Electronic device 210 includes a memory 212, a processor 220, a transmitter 250, and a receiver 252. Memory 212 may include one or more memory devices, such as a RAM, a ROM, a flash memory, or a combination thereof, as illustrative, non-limiting examples. The memory 114 includes instructions 214, one or more PCIs 216, and one or more thresholds 218. In aspects, memory 212 may store the instructions 214 that, when executed by processor 220, cause the processor 220 to perform operations according to aspects of the present disclosure, as described herein, such as one or more operations as described with reference to at least FIGS. 4-7.

Processor 220 may include one or more processors, such as a baseband processor, an application processor, or both. Processor 220 may be coupled to memory 212, transmitter 250, and/or receiver 252. For example, processor 220 may be configured to access or receive instructions 214, one or more PCIs 216, and/or one or more thresholds 218, such as a one or more default thresholds, one or more updated thresholds, or both. In some implementations, processor 220 may include another memory (not shown), such as a cache memory or other local memory. Processor 220 may be configured to execute software (e.g., a program represented by one or more of the instructions 214) stored in a corresponding memory 212 (e.g., a non-transitory computer readable medium). For example, processor 220 (e.g., one or more processors) may be configured to execute the instructions 214 that cause the processor 220 to perform one or more operations as described at least with reference to FIGS. 4-7.

Processor 220 is configured to perform one or more cell ID search operations. As shown, processor 220 includes a primary synchronization signal (PSS) successive interference cancellation (SIC) loop 222 and a secondary synchronization signal (SSS) SIC loop 232. PSS SIC loop 222 is coupled to SSS SIC loop 232 and is configured to provide one or more outputs to SSS SIC loop 232, as described further herein. The PSS SIC loop 222 and/or the SSS SIC loop 232 may include hardware, software, or a combination thereof. PSS SIC loop 222 is configured to perform one or more processing loops on a received signal, where each processing loop is configured to perform a PSS detection operation associated with detection of a PSS index (e.g., a PSS sequence index). SSS SIC loop 232 is configured to perform one or more processing loops on a received signal, where each processing loop is configured to perform a SSS detection operation associated with detection of a SSS index (e.g., a SSS sequence index). For each detected SSS index, processor 220 (e.g., SSS SIC loop 232) may be configured to output a cell ID 270, such as a PCI, that is generated based on the detected SSS index (from the SSS SIC loop 232) and a corresponding detected PSS index (from the PSS SIC loop 222).

PSS SIC loop 222 includes a combiner 223 (e.g., an adder and/or a subtractor), a PSS detector 224 configured to perform PSS detection, a PSS comparator 226 configured to perform one or more comparisons, and a PSS regenerator 228 configured to perform PSS regeneration. PSS SIC loop 222 is configured to receive an input signal (e.g., received signal 260 during an initial loop or a SIC version of received signal 260 during an additional loop) and perform a PSS detection operation (e.g., 224).

The PSS detection operation may include calculating a normalized correlation power result between the input signal and a local PSS (e.g., a generated local PSS sequence generated based on a Zadoff-Chu sequence in the frequency domain) and identifying a maximum peak power value of the normalized correlation power result. To illustrate, a correlation power result between the input signal and the local PSS may be normalized based on a total received signal power (e.g., of received signal 260) that may be determined by receiver 252 and/or processor 220. In some implementations, the local PSS are used to generate (e.g., provide) timing offset 262 (e.g., timing offset information) in a time domain. For example, an inverse fast Fourier transform (IFFT) may be performed on the frequency domain sequence (e.g., the Zadoff-Chu generated sequence) to generate a time domain sequence. Additionally, or alternatively, the input signal may be down sampled prior to being processed by PSS SIC loop 222 to reduce calculation complexity at PSS SIC loop 222. The PSS detection operation may include identifying a power value of the normalized correlation power result, such as a maximum peak power. The identified power value may be provided to PSS comparator 226.

PSS comparator 226 is configured to compare the identified power value to a threshold value (e.g., a default PSS threshold included in the one or more thresholds 218). If the power value is greater than or equal to the threshold value (e.g., the default PSS threshold), PSS comparator 226 identifies a PSS index (e.g., PSS index 264) that corresponds to the power value. The PSS index 264 and the timing offset 262 are provided to SSS SIC loop 323. For each PSS index identified by PSS SIC loop 222, SSS SIC loop 232 may perform one or more SSS detection operations.

PSS regenerator 228 is configured to regenerate a PSS component (e.g., a PSS sequence) associated with the identified PSS index (e.g., 264) and provide the regenerated PSS component to combiner 223. To regenerate the PSS component, the local PSS sequence is multiplied with a channel estimation result. For example, the channel estimation result may be calculated by the arithmetic mean of the dot product of received PSS signals and the local PSS sequence. In some implementations, the mean value is used as the channel estimation result based on an assumption that the channel response in the subcarriers (e.g., 62 subcarriers) are the same. The regenerated PSS sequence may be determined in the frequency domain and transformed to the time domain (using an inverse fast Fourier transform (IFFT)) so remove the regenerated PSS sequence from the received signal as described further herein. As another example, PSS regeneration may be done by individually removing, for each identified cell, a corresponding component determined based on a particular channel estimation result multiplied by the PSS local sequence. It is noted that individual removal may be more computationally complex and time intensive than using one channel estimation value for the received PSS signals. In some implementations, PSS regenerator does not regenerate PSS component until after SSS SIC loop 312 has identified all SSS indices that correspond to the PSS index (e.g., 264).

Combiner 223 is configured to subtract the regenerated PSS component from received signal 260 to generate a modified received signal. The modified received signal is provided to PSS detector 224 as part of a next iteration of PSS SIC loop 222. If a PSS index is identified during the next iteration (e.g., a second PSS iteration) of PSS SIC loop 222 and another iteration (e.g., a third PSS iteration) of PSS SIC loop 222 is to be performed, combiner 223 is configured to subtract a regenerated PSS component of a second PSS index (corresponding to the second PSS iteration) from the modified received signal to generate another modified received signal (for use during the third PSS iteration). PSS SIC loop 222 may continue to perform iterations until a particular iteration fails to identify a PSS index. Additionally, or alternatively, in some implementations, PSS SIC loop 222 is configured to perform a maximum number of iterations, such as three iterations.

SSS SIC loop 232 is configured to perform one or more iterations (e.g., one or more loops) for a particular PSS index (e.g., 264) to identify one or more PSS indices and to generate corresponding cell IDs (e.g., 270), such as corresponding PCIs. An example of operation of SSS SIC loop 232 is described herein at least with reference to FIG. 3.

SSS SIC loop 232 includes a combiner 233 (e.g., an adder and/or a subtractor), a time offset compensator 234, a SSS detector 236, a threshold generator 238 (e.g., a threshold selector/updater), a SSS comparator 240, and a SSS regenerator 242. For a given PSS index (e.g., 264) SSS SIC loop 232 is configured to receive an input signal (e.g., received signal 260 during an initial loop or a SIC version of received signal 260 during an additional loop) and time offset compensation based on timing offset 262. For example, time offset compensator 234 is configured to offset a received signal based on a timing offset (e.g., 262) received from PSS SIC loop 222. The time offset signal is provided to SSS detector 236 which is configured to perform a SSS detection operation. In some implementations, an input signal to the time offset compensator 234 (or the output of the time offset compensator 24) may be down sampled to reduce calculation complexity at SSS SIC loop 232. In a particular implementation, to reduce an amount of computations, a Hadamard transform may be used to detect the SSS sequence in the received signal. For example, the Hadamard transform may be used to compute the correlation result between an input signal (e.g., a received signal) and a local SSS sequence. In some implementations, down sampling or the transformation may be performed by SSS detector 236 to reduce calculation complexity of subsequent processing.

The SSS detection operation may include calculating a normalized correlation power result between the input signal and a local SSS (e.g., a generated local SSS sequence) and identifying a maximum peak power value of the normalized correlation power result. As an example of the local SSS, the local SSS may be generated as an interleaved concatenation of two length-31 binary sequences that is then scrambled with a scrambling sequence based on the corresponding PSS index. It is noted that the local SSS may be determined in the frequency domain and an inverse fast Fourier transform (IFFT) may be performed to generate a time domain sequence. A correlation power result between the input signal and the local SSS may be normalized based on a total received signal power (e.g., of received signal 260) that may be determined by receiver 252 and/or processor 220. In some implementations, the correlation power results are determined in the frequency domain. The SSS detection operation may include identifying a power value of the normalized correlation power result, such as a maximum peak power. The identified power value may be provided to threshold generator 238 and SSS comparator 240.

Threshold generator 238 may be configured to generator and/or select a threshold to be used by SSS comparator 240. During an initial loop of SSS SIC loop 232, threshold generator 238 may select a default SSS threshold. The default threshold may be associated with a target false alarm rate and may be computed as:

$$\begin{cases} \sum_{n=0}^{L-1}(z(n) \times s^*(n)) \sim N(0, L \times \sigma^2) \\ \sum_{n=0}^{L-1} \frac{(z(n))^2}{\sigma^2} \sim \chi^2(L) \end{cases} \Rightarrow \frac{\left(\sum_{n=0}^{L-1}(z(n) \times s^*(n))\right)^2}{\sum_{n=0}^{L-1}(z(n))^2|} \sim F(1, L) \Rightarrow$$

$$\text{Threshold} = ICDF_{F(1,L)}(1 - FA)$$

where $z(n)$ is addition Gaussian white noise which obeys $N(0, \sigma^2)$, $s(n)$ is a sequence used in synchronizing signal with L length, FA is a target false alarm rage when input signal is only noise and $ICDF_{F(1,L)}$ is the inverse cumulative distribution function for F-distribution with 1 and L degree of freedom.

During subsequent iterations for a particular PSS index (e.g., 264), threshold generator 238 may determine or select a SSS threshold based on a correlation power value (e.g., a maximum normalized peak power value) of a previous (e.g., a most recent) SSS SIC loop iteration. For example, threshold generator 238 may generate a candidate threshold by multiplying the correlation power value (e.g., a maximum normalized peak power value) of the previous (e.g., a most recent) SSS SIC loop iteration by a default value. In some implementations, the candidate threshold may automatically be used for the iteration. In other implementations, the threshold generator 238 may select a larger of the candidate threshold and the threshold used in the previous (e.g., most recent) SSS SIC loop iteration. In another implementation, threshold generator 238 may determine a SSS threshold for a particular iteration as follows:

$$SSS\_Threshold_{n+1} =$$
$$\begin{cases} Threshold\_1_{n+1}, & \text{if } 1^{st} \text{ SSS detection after PSS detection} \\ Threshold\_2_{n+1}, & \text{otherwise} \end{cases}$$

and, $Threshold\_1_{n+1} =$
$$\begin{cases} Default\_Threshold & \text{if } 1^{st} \text{ SSS detection during cell search} \\ \max\{Threshold\_1_n, \alpha \times SSSPeakValue_n\}, & \text{otherwise} \end{cases}$$

$Threshold\_2_{n+1} =$
$$\begin{cases} Threshold\_1_n, & \text{if } 1^{st} \text{ SSS detection after PSS detection} \\ \max\{Threshold\_2_n, (1-\beta) \times Threshold\_1_n + \beta \times SSSPeakValue_n\}, & \text{otherwise} \end{cases}$$

where n means nth SSS detection during a cell search procedure, Default_Threshold is determined as described above, $SSSPeakValue_n$ is the nth SSS normalized correlation peak value, a and f are predetermine (e.g., set manually by a user or automatically determined by electronic device 210, such as processor 220) to tradeoff between false alarm rate and miss detection rate. As an illustrative, non-limiting example, $\alpha=0.25$ and $\beta=0.33$.

SSS comparator 240 is configured to perform one or more comparisons. For example, SSS comparator 240 is configured to compare the identified power value to a threshold value indicated by the threshold generator 238, such as a default SSS threshold included in the one or more thresholds 218 or an updated threshold provided by threshold generator 238. If the power value is greater than or equal to the threshold value, SSS comparator 240 identifies a SSS index that corresponds to the power value. The SSS index and the PSS index (e.g., 264) are used to generate cell ID 270.

SSS regenerator 342 is configured to perform SSS regeneration. SSS regenerator 342 is configured to regenerate a SSS component (e.g., a SSS sequence) associated with the identified SSS index and provide the regenerated SSS component to combiner 233. To regenerate the SSS component, the local SSS sequence is multiplied with a channel estimation result. For example, the channel estimation result may be calculated by the arithmetic mean of the dot product of received SSS signals and the local SSS sequence. In some implementations, the mean value is used as the channel estimation result based on an assumption that the channel response in the subcarriers (e.g., 62 subcarriers) are the same. The regenerated SSS sequence may be determined in the frequency domain and transformed to the time domain (using an inverse fast Fourier transform (IFFT)) so remove the regenerated SSS sequence from the received signal as described further herein.

Combiner 233 is configured to subtract the regenerated SSS component from received signal 260 go generate a modified received signal. The modified received signal is provided to time offset compensator 234 as part of a next iteration of SSS SIC loop 232. SSS SIC loop 232 may continue to perform iterations until a particular iteration fails to identify a SSS index. In some implementations, for a cell search operation, each initial iteration of a subsequent SSS SIC loop (after an initial SSS SIC loop) uses a previously modified signal generated based on a last iteration (e.g., a final iteration) of a prior loop, such as a most recent previous loop. Additionally, or alternatively, in some implementations, SSS SIC loop 232 is configured to perform a maximum number of iterations, such as three iterations, to reduce an amount of computations and a duration of the computations.

Transmitter 250 is configured to transmit data to one or more devices (e.g., base stations). Receiver 252 is configured to signals from one or more devices (e.g., base stations). For example, receiver 252 may be configured to receive PCI data 180 (e.g., PCI signals—a PSS signal and a SSS signal). The PCI data 180 received by the receiver 252 may be provided to processor 220 as received signal 260. As another example, in implementations where electronic device 210 includes a base station, transmitter 250 may be configured to transmit PCI data (e.g., PCI signals—a PSS signal and a SSS signal) that indicates a PCI of the electronic device 210. In some implementations, the receiver 252 and the transmitter 250 are included in a transceiver.

In another particular aspect of electronic device 210, electronic device 210 includes receiver 252 configured to receive a signal (e.g., 180, 260) and processor 220. Processor 220 is coupled to receiver 252 and configured to execute instructions 214 to cause processor 220 to detect a first SSS index based on a comparison between a first power value and a first threshold. The first power value may be associated with a correlation power result between a received signal and a local SSS. Processor 220 is further configured to execute instructions 214 to cause processor 220 to determine a second threshold based on the first power value and to perform a comparison between a second power value and the second threshold, the second power value determined based on the received signal.

As described with reference to FIG. 2, electronic device 210 (e.g., base station 105 or UE 115) may perform cell search operations. Electronic device 210 advantageously performs operations associated with a cell search in a manner that has a low miss detection rate and a low false alarm rate. For example, dynamically updating a SSS threshold enables a false alarm rate to be low during multiple iterations of SSS SIC loop 232. Additionally, or alternatively, electronic device 210 beneficially has a lower computational complexity and/or more efficient performance than conventional cell search techniques that implement SIC operations. To illustrate, cell search operations performed by electronic device 210 may detect multiple SSS indices for an identified PSS index without having to perform PSS cancellation and/or PSS detection between SSS detection operations (associated with the PSS index).

Figure 3:
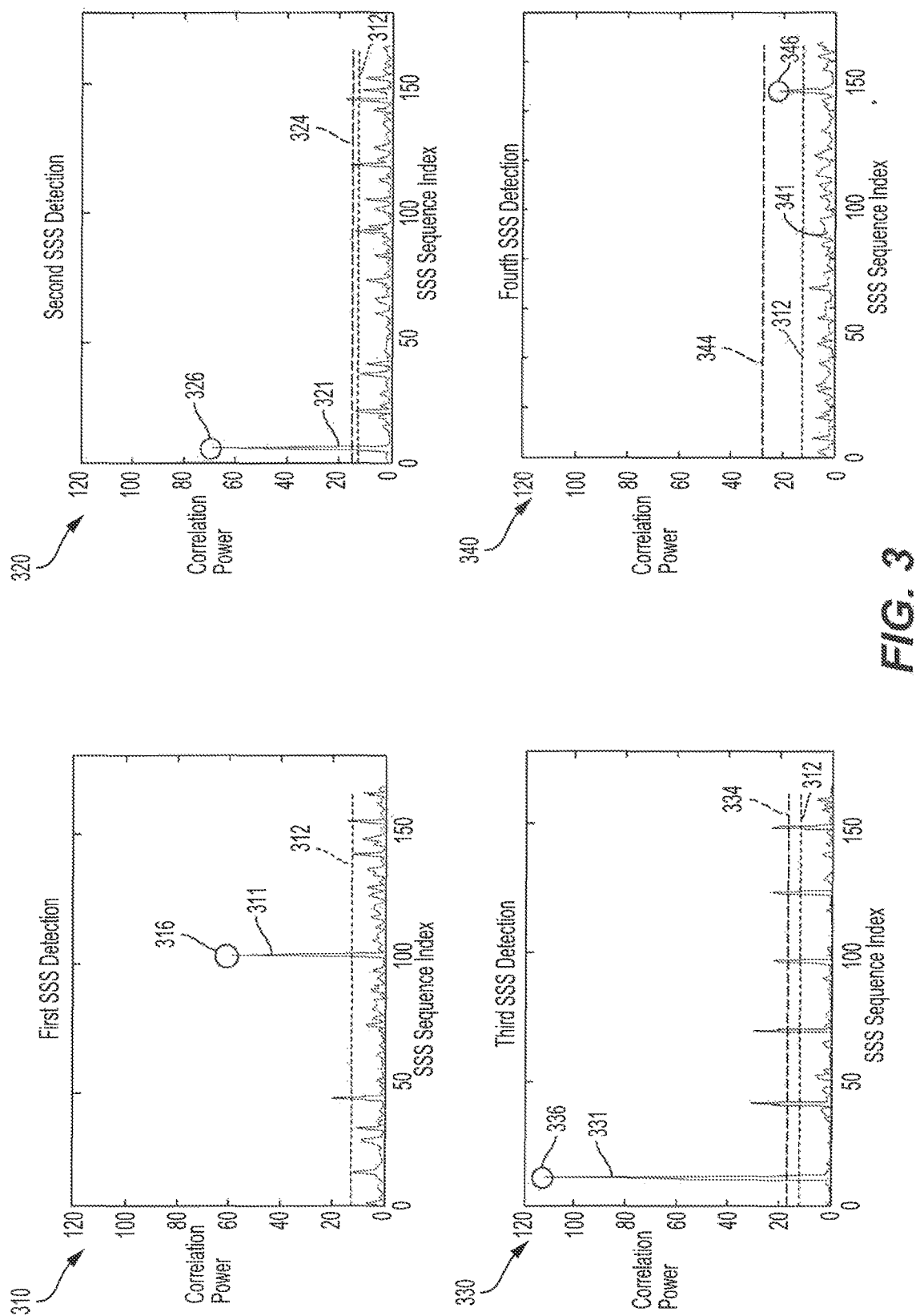
FIG. 3 depicts graphs to illustrate an example of threshold modification based on a correlation result.

Referring to FIG. 3, graphs are shown to illustrate multiple loop iterations of SSS index detection. For example, FIG. 3 includes a first graph 310 illustrating an example of a first SSS detection iteration, a second graph 320 illustrating an example of a second SSS detection iteration, a third graph 330 illustrating an example of a third SSS detection iteration, and a fourth graph 340 illustrating an example of a fourth SSS detection iteration. Each of the graphs 310, 320, 330, 340 may correspond to an SSS detection iteration for the same PSS index. Additionally, each graph 310, 320, 330, 340 includes an x-axis (e.g., a horizontal axis) of SSS sequence index values and a y-axis (e.g., a vertical axis) of correlation power in units of power. As described with reference to FIG. 3, the correlation power may include a normalized correlation power as described herein with reference to at least FIG. 2. The multiple loop iterations of SSS index detection may be performed by an electronic device, such as a base station or a UE. For example, the electronic device may include base station 105a, 105b, 105c, 105w, 105x, 105y, 105z, UE 115, or electronic device 210 (e.g., processor 220, PSS SIC loop 222, and/or SSS SIC loop 232).

Referring to first graph 310, a first signal 311 corresponding to the first SSS detection iteration is shown. The first signal 311 may include a normalized correlation power result between the received signal and a local PSS. A first maximum peak power value of first signal 311 is indicated by circle 316. First graph 310 also depicts a first threshold 312 (e.g., a SSS threshold). For example, first threshold 312 may include a default threshold. As shown, the first maximum peak power value is greater than or equal to the first threshold 312, thus indicating a first SSS index of a first detected SSS.

Referring to second graph 320, a second signal 321 corresponding to the second SSS detection iteration is shown. The second signal 321 may include a normalized correlation power result between a first modified received signal and a local PSS. The first modified received signal may be generated by canceling a SSS component associated with the first SSS index from the received signal. A second maximum peak power value of second signal 321 is indicated by circle 326. It is noted that by cancelling the SSS component associated with the first SSS index (and after normalization), the second peak power is now identifiable.

Second graph 320 also depicts first threshold 312 (e.g., a default SSS threshold) and a second threshold 324 (e.g., a second SSS threshold). The second threshold 324 may have been dynamically determined based on the first maximum peak power value (e.g., based on the previous normalized correlation power peak). For example, second threshold 324 may be determine by multiplying the first maximum peak power value by a default value. During the second iteration, the second threshold 324 may be used because the second threshold 324 is greater than the first threshold 312. As shown, the second maximum peak power value is greater than or equal to the second threshold 324, thus indicating a second SSS index of a second detected SSS.

Referring to third graph 330, a third signal 331 corresponding to the third SSS detection iteration is shown. The third signal 331 may include a normalized correlation power result between a second modified received signal and a local PSS. The second modified received signal may be generated by canceling a SSS component associated with the second SSS index from the first modified received signal. A third maximum peak power value of third signal 331 is indicated by circle 336. It is noted that by cancelling the SSS component associated with the second SSS index (and after normalization), the third peak power is now identifiable.

Third graph 330 also depicts first threshold 312 (e.g., a default SSS threshold) and a third threshold 334 (e.g., a third SSS threshold). The third threshold 334 may have been dynamically determined based on the second maximum peak power value (e.g., based on the previous normalized correlation power peak). For example, third threshold 334 may be determine by multiplying the second maximum peak power value by a default value. During the third iteration, the third threshold 334 may be used because third threshold 334 is greater than the first threshold 312 (and greater than or equal to the second threshold 324). As shown, the third maximum peak power value is greater than or equal to the third threshold 334, thus indicating a third SSS index of a third detected SSS.

Referring to fourth graph 340, a fourth signal 341 corresponding to the fourth SSS detection iteration is shown. The fourth signal 341 may include a normalized correlation power result between a third modified received signal and a local PSS. The third modified received signal may be generated by canceling a SSS component associated with the third SSS index from the second modified received signal. A fourth maximum peak power value of fourth signal 341 is indicated by circle 346. It is noted that by cancelling the SSS component associated with the third SSS index (and after normalization), the fourth maximum peak power is now identifiable.

Fourth graph 340 also depicts first threshold 312 (e.g., a default SSS threshold) and a fourth threshold 344 (e.g., a fourth SSS threshold). The fourth threshold 344 may have been dynamically determined based on the third maximum peak power value (e.g., based on the previous normalized correlation power peak). For example, fourth threshold 344 may be determine by multiplying the third maximum peak power value by a default value. During the fourth iteration, the fourth threshold 344 may be used because fourth threshold 344 is greater than the first threshold 312 (and greater than or equal to each of the second threshold 324 and the third threshold 334). As shown, the fourth maximum peak power value is not greater than or equal to the fourth threshold 344, thus indicating that no SSS is detected based on the fourth maximum peak power value. Stated in another manner, based on a comparison between the fourth maximum peak power value and the fourth threshold 344, the fourth maximum peak power value is identified as a spurious peak that does not belong to an actual cell. The spurious peak may be present and/or caused by imperfect channel estimation result(s) used to cancel one or more detected SSS sequences. It is noted that, as shown, the fourth maximum peak power value is greater than each of the first threshold 312, the second threshold 324, and the third threshold 334.

FIG. 3 thus demonstrates advantages of dynamically updating a SSS threshold during iterations of a SSS SIC loop (e.g., 232). The SIC operations cancel interference (e.g., stronger PSS signals and/or stronger SSS signals) to find weaker signals which were suppressed by the stronger signals. By dynamically updating the SSS threshold according to previous peak value dynamically, spurious peaks in later iterations of the SSS SIC loop may not be detected as SSS indices thereby avoiding false detection.

Referring to FIGS. 4-7, examples of methods associated with performing a cell identification operation are shown. For example, one or more of the methods of FIGS. 4-7 may be performed to determine a PSS index, a PSS index, a PCI, or a combination thereof. Each of the methods of FIGS. 4-7 may be performed by an electronic device, such as a base station or a UE. For example, the electronic device may include base station 105$a$, 105$b$, 105$c$, 105$w$, 105$x$, 105$y$, 105$z$, UE 115, or electronic device 210 (e.g., processor 220, PSS SIC loop 222, and/or SSS SIC loop 232).

Each of the methods of FIGS. 4-7 enable operations associated with a cell search in a manner that has a low miss detection rate and a low false alarm rate. For example, dynamically updating a SSS threshold, as described with reference to FIGS. 4-7, enables a low false alarm rate. Additionally, or alternatively, the methods of FIGS. 4-7 have a lower computational complexity and/or more efficient performance than conventional cell search techniques that implement SIC operations. To illustrate, cell search operations described with reference to FIGS. 4-7 may detect multiple SSS indices for an identified PSS index without having to perform PSS cancellation and/or PSS detection between SSS detection operations (associated with the PSS index).

Figure 4:
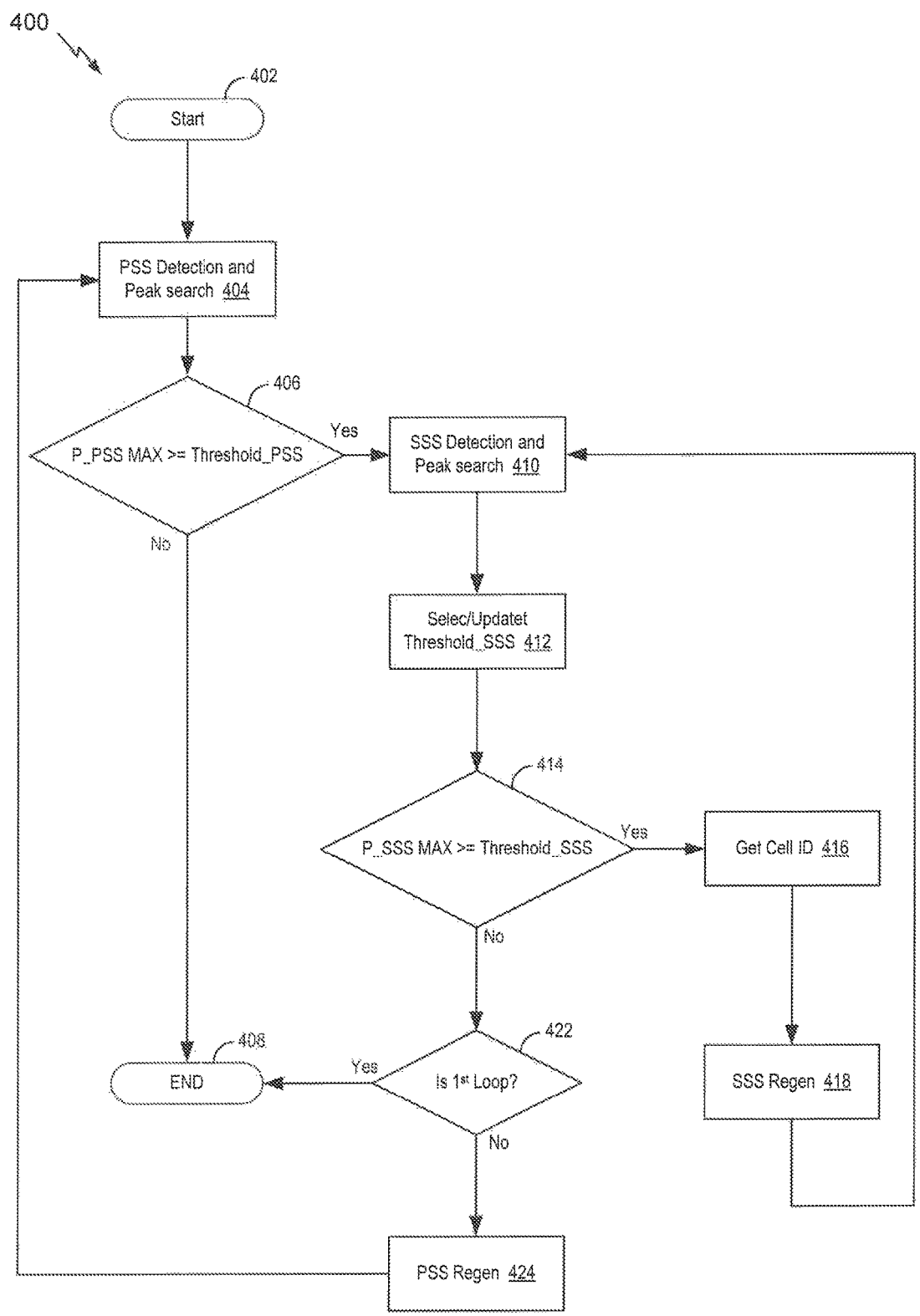
FIG. 4 is a flow diagram illustrating aspects of a method for identifying PCI information.

Referring to FIG. 4, a method 400 of performing a cell identification operation is shown. For example, method 400 may be used to determine a cell ID, such as a PCI. The method 400 begins at 402 and includes performing PSS detection and peak search operation, at 404. The PSS detection and peak search operation may include or correspond to PSS detector 224 (e.g., PSS detection). For example, the PSS detection and peak search operation may calculate a normalized correlation power result between the received signal and a local PSS and identify a maximum peak power value of the normalized correlation power result. The method 400 may determine whether the peak power (e.g., the maximum peak power value of the normalized correlation power result) is greater than or equal to a PSS threshold, at 406. For example, a determination whether the peak power is greater than or equal to the PSS threshold may be performed by PSS comparator 226. If a determination is made that the peak power is less than the PSS threshold, method 400 ends at 408. Alternatively, if a determination is made that the peak power is greater than or equal to the PSS threshold, the method 500 includes performing SSS detection and peak search operation, at 410. The SSS detection and peak search operation may include may calculate a normalized correlation power result between the received signal and a local SSS and identify a maximum peak power value of the normalized correlation power result.

The method 400 includes selecting and/or updating a SSS threshold, at 412. To illustrate, for a given PSS index, method 400 may attempt to identify one or more SSS indices. For an initial attempt to identify a SSS index, method 400 may select a default SSS threshold. For subsequent attempts to identify additionally SSS indices, the method 400 may use the default SSS threshold or may use an updated SSS threshold. The updated SSS threshold may be calculated based on a previous (e.g., most recently determined) correlation power peak value. To illustrate, an alternative threshold may be determined by a function of the previous detected normalized correlation power peak value and the updated threshold may be selected as the larger of the alternative threshold and the most recently used threshold. The method 400 includes determining whether the peak power is greater than or equal to the selected SSS threshold, at 414. To illustrate, for the initial attempt to identify a SSS index, the method 400 may compare the maximum peak power value of the normalized correlation power result to the default threshold. If a determination is made that the peak power is less than the SSS threshold, method 400 advances to 422 where a determination is made whether a current loop is an initial (e.g., the first) first SSS loop of a corresponding detected PSS index. Alternatively, if a determination is made that the peak power is greater than or equal to the SS threshold, a SSS is confirmed (e.g., a SSS index is identified) and method 400 determines a cell ID, at 416. To illustrate, the cell ID may be determined based on the identified PSS index and the identified SSS index.

The method 400 regenerates a SSS sequence, at 418 and cancels the detected SSS from the received signal. For example, the method 400 may regenerate the received SSS sequence associated with the detected physical layer cell identity (e.g., NID2/NID1, where NID2 is the PSS index and NID1 is the SSS index) and estimated channel response. For the initial attempt to identify the SSS index, the regenerated SSS sequence may be subtracted from received signal to cancel the detected SSS and produce the modified received signal. For each subsequent attempt, the regenerated sequence may be subtracted from the previous (e.g., most recently generated) SSS modified received signal. After the SSS regeneration, at 418, the method 400 performs SSS detection and peak search, at 410, based on the modified received signal generated at 410 as part of an attempt to identify another SSS index.

Referring to the determining whether the current loop is a first loop (e.g., an initial SSS loop for a corresponding PSS index), at 422, if a determination is made that the current SSS loop is the first SSS loop for a corresponding PSS index, the method advances and ends at 408 and no pore PCIs are detected. Alternatively, if a determination is made that the current SSS loop is not the first SSS loop, SSS SIC loops for the corresponding detected PSS index are finished and the method 400 performs PSS regeneration at 424. For example, the method 400 may regenerate a PSS component associated with a previously detected PSS index (e.g., a most recently detected PSS index) and may subtract the regenerated PSS component from the received signal to generate a PSS modified received signal. It is noted that the regenerated PSS component includes each of the detected SSS components that share the same previously detected PSS index. Regeneration and subtraction may be performed by PSS regenerator 228 and combiner 223, respectively. The method 400 may advance to perform PPS detection and search operations, at 404, on the PSS modified received signal to attempt to identify another PSS index. If another PSS index value is identified, the SSS detection and peak search operation, at 410, may be performed starting with the PSS modified received signal.

Figure 5:
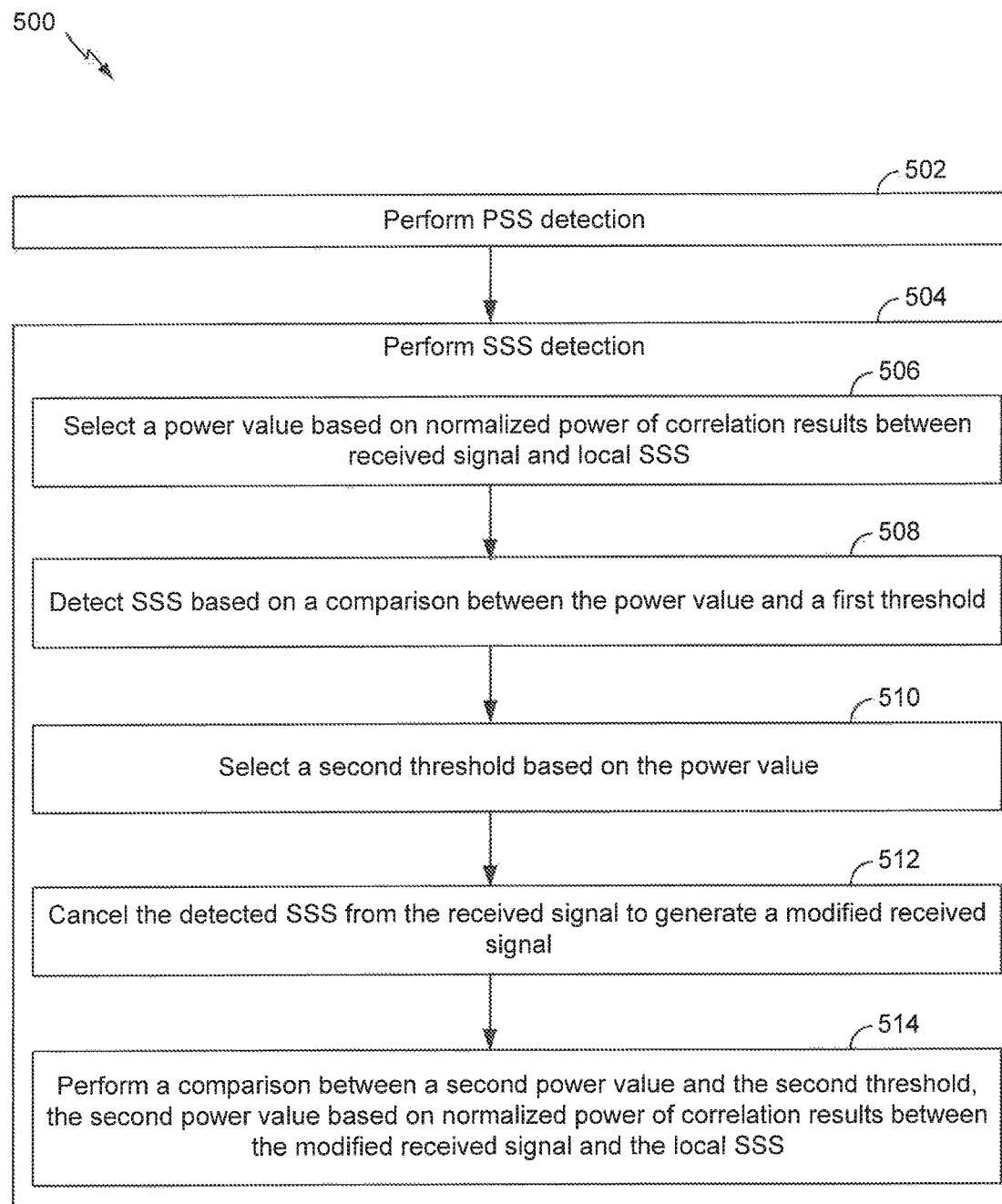
FIG. 5 is a flow diagram of an example of a method for performing a cell search operation.

Referring to FIG. 5, a method 500 of detecting a secondary synchronization signal (SSS) index is shown. In some implementations, method 500 may be used to determine one or more cell IDs, such as a PCI. The method 500 includes performing PSS detection, at 502. For example, PSS detection may be performed by processor 220 and/or PSS SIC loop 222 of FIG. 2. The PSS detection may determine a PSS index (e.g., 264), a timing offset (e.g., 262), or both. The method 500 also includes performing SSS detection, at 504. For example, SSS detection may be performed by processor 220 and/or SSS SIC loop 232.

To perform SSS detection, the method 500 includes selecting a power value based on normalized power of correlation results between a received signal and a local SSS, at 506. In some implementations, the power value may be determined as a maximum peak power value of the normalized correlation power results. The method 500 further includes include detecting a SSS (e.g., a SSS index) based on a comparison between the power value and a first threshold, at 508. The first threshold may include a default threshold.

The method 500 also includes selecting a second threshold based on the power value, at 510. Selecting the second threshold may include calculating alternative threshold by a function of the detected power value (e.g., the previous normalized correlation power peak value). In a particular implementation, the function of detected power value previous normalized correlation power peak value can be a function that includes multiplying the detected power value by a pre-defined constant. The alternative threshold may be compared to the first threshold (e.g., the default threshold) and the larger of the two may be selected as the second threshold for use in another SSS detection operation.

The method 500 includes canceling the detected SSS from the received signal to generate a modified received signal, at 512. Canceling the detected SSS from the received signal may include regenerating the received SSS sequence associated with the detected physical layer cell identity (e.g., NID2/NID1, where NID2 is the PSS index and NID1 is the SSS index) and estimated channel response. The regenerated SSS sequence may be subtracted from received signal to cancel the detected SSS and produce the modified received signal.

The method 500 further includes performing a comparison between a second power value and the second threshold, at 514. The second power value may be based on normalized power of correlation results between the modified received signal and the local SSS.

Figure 6:
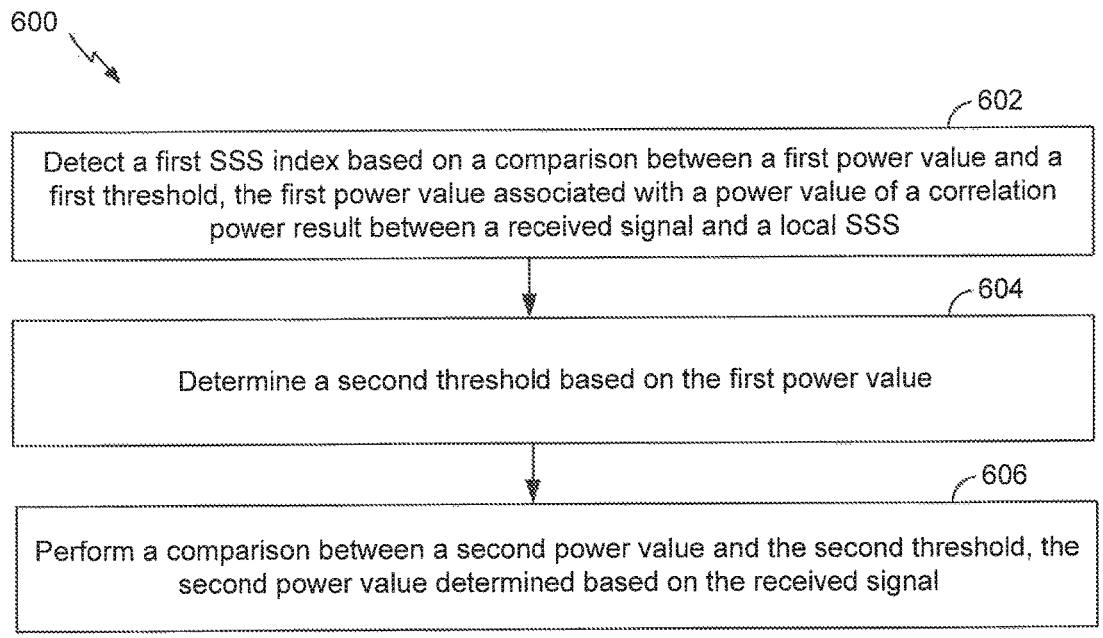
FIG. 6 is a flow diagram of an example of a method for identifying PCI information.

Referring to FIG. 6, a method 600 of detecting a secondary synchronization signal (SSS) index is shown. In some implementations, method 600 may be used to determine one or more cell IDs, such as a PCI.

Method 600 includes detecting, at an electronic device, a first SSS index based on a comparison between a first power value and a first threshold, at 602. The first power value is associated with a correlation power result between a received signal from a base station and a local SSS. For example, the first power value may include a maximum peak power of the correlation power result. The first threshold may include a default threshold, and the first SSS index may be detected based on a determination that the first power value is greater than or equal to the first threshold.

The method 600 further includes determining, at the electronic device, a second threshold based on the first power value, at 604. In some implementations, the method 600 may include calculating the second threshold by multiplying the first power value by a default value. In other implementations, the method 600 may include calculating a candidate threshold based on the first power value and comparing the candidate threshold and a default threshold. In such implementations, the second threshold may be selected as a larger of the candidate threshold and the default threshold.

The method 600 also includes performing a comparison between a second power value and the second threshold, the second power value determined based on the received signal, at 606. To illustrate, the method 600 may include, after detection of the first SSS index, determining a first physical cell identity (PCI) based on the first SSS index and a primary synchronization signal (PSS) index and cancelling a SSS component associated with the first SSS index from the received signal to generate a first modified received signal. The second power value may be determined based on the first modified received signal. In such implementations, cancelling the SSS component may include generating an SSS sequence for the first SSS index and subtracting the generated SSS sequence from the received signal to generate the first modified received signal. In some implementations, the method 600 may include calculating a second correlation power result between the first modified received signal and the local SSS, and selecting the second power value from the second correlation power result.

In some implementations, the method 600 may include identifying the second power value as a spurious peak based on the comparison between the second power value and the second threshold and, in response to identification of the spurious peak, canceling a PSS component associated with the PSS index from the received signal to generate a second modified received signal. Alternatively, in other implementation, the method 600 may include detecting, at the electronic device, a second SSS index based on the comparison between the second power value and the second threshold. In such implementations, the method 600 may further include determining, a the electronic device, a third threshold based on the second power value, and performing a comparison between a third power value and the third threshold, the third power value determined based on the received signal. In a particular implementation, the method 600 also includes detecting, at the electronic device, a third SSS index based on the comparison between the third power value and the third threshold.

In some implementations, the method 600 may include calculating the correlation power result between the received signal and the local SSS and selecting the first power value of the correlation power result. In such implementations, the method 600 may further include performing the comparison between the first power value and the first threshold. The method 600 may optionally include normalizing the correlation power result and identifying a maximum power of the normalized correlation power result to be selected as the first power value. As an illustrative, non-limiting example, the correlation power result is performed in a frequency domain and the correlation power result is normalized based on the total receive signal power of the received signal.

In some implementations, prior to calculating the correlation power result between the received signal and the local SSS, the receive signal may be down sampled, a transformation operation may be performed on the received signal, or both. For example, the received signal may be down sampled to generate a down sampled version of the received signal which is then transformed to generated a transformed down sampled version of the received signal. The correlation power result may be determined based on the down sampled version of the received signal or the transformed down sampled version of the received signal. As another example, the receive signal is transformed to generate a transformed version of the received signal and the correlation power result may be determined based on the transformed version of the received signal. In a particular implementation, a Hadamard transformation may be performed to calculate the correlation result between the received signal and the local SSS sequence. It is noted that down sampling and/or transforming the received signal may reduce a calculation complexity associated with identification of one or more cell IDs, which may save processing time and time.

In some implementation, after each SSS index detection operation for the PSS index, the method 600 may determine whether a number of SSS index operations performed for the PSS index is greater than or equal to a threshold number. In response to a determination that the number of SSS index operations performed for the PSS index is greater than or equal to the threshold number, the method 600 may cancel a PSS component associated with the PSS index from the received signal to generate a second modified received signal.

Figure 7:
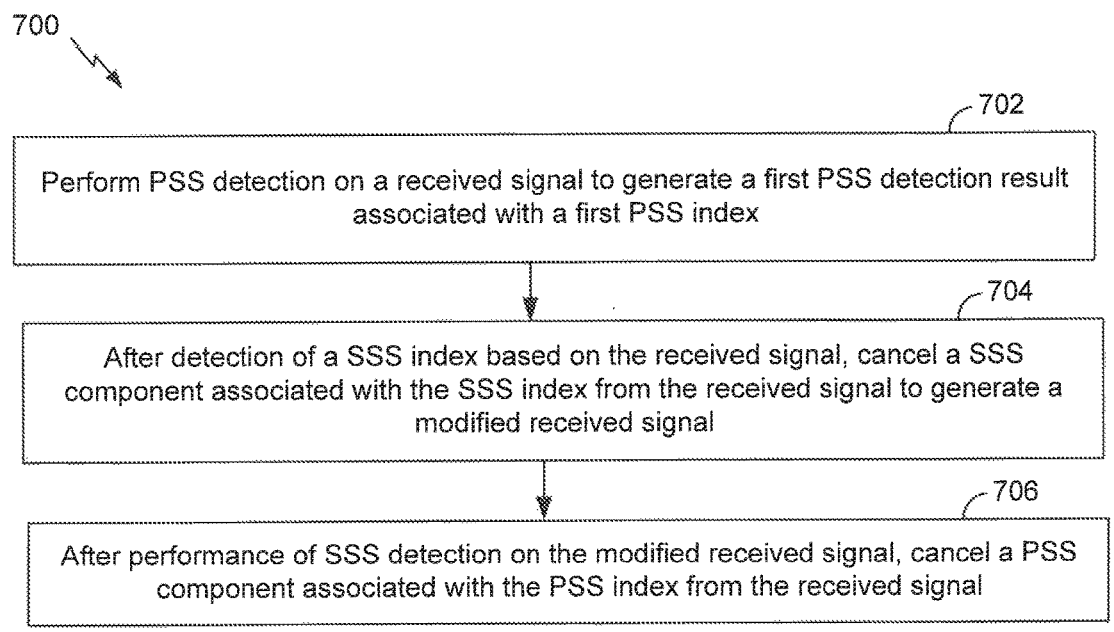
FIG. 7 is a flow diagram of another example of a method for identifying PCI information.

Referring to FIG. 7, a method 700 of detecting a secondary synchronization signal (SSS) index is shown. In some implementations, method 700 may be used to determine one or more cell IDs, such as a PCI.

Method 700 includes performing a primary synchronization signal (PSS) detection operation on the received signal to generate a first PSS detection result associated with a first PSS index, at 702. In some implementations, the PSS detection operation may include calculating a correlation power result between the received signal and a local PSS. In such implementations, the correlation power result may be performed in a time domain and the method 700 may include determine a timing offset between the received signal and the local PSS. Additionally, or alternatively, in such implementations, method 700 includes detecting a particular power value, such as a maximum peak power value, of the correlation power result between the received signal and the local PSS, and detecting the first PSS index based on a comparison between the particular power value and a PSS threshold. The PSS threshold may be a default threshold.

In some implementation, when the method 700 calculates the correlation power result, the received signal may be down sampled to generate a down sampled version of the received signal and the correlation power result is calculated based on the down sampled version of the received signal and the local PSS. In a particular implementation, to perform the PSS detection operation, the method 700 includes normalizing the correlation power result. For example, the correlation power result is normalized based on a total received signal power of the received signal, as an illustrative, non-limiting example. The particular power value may be selected as a maximum power of the normalized correlation power result.

Method 700 further includes, after detection of the first SSS index, canceling a SSS component associated with the SSS index from the received signal to generate a first modified received signal, at 704. In some implementations, the method 700 may include determining a first physical cell identifier (PCI) based on the first PSS index and the first SSS index.

Method 700 also includes, after performance of a SSS detection operation on the first modified received signal, canceling a PSS component associated with the first PSS index from the received signal to generate a second modified received signal, at 706. In some implementations, a second SSS index may be determined based on the second the SSS detection operation and a second PCI may be determined based on the first PSS index and the second SSS index.

In some implementations, the method 700 may include performing a PSS detection operation on the second modified received signal to generate a second PSS detection result associated with a second PSS index. After detection of the second PSS index, method 700 may include detecting a third SSS index and determining a third PCI based on the second PSS index and the third SSS index.

The process shown or described in any of the systems and/or devices of FIGS. 1-2, the graphs of FIG. 3, the methods of FIGS. 4-7, or a combination thereof, may be controlled by a processing unit such as a central processing unit (CPU), a controller, a field-programmable gate array (FPGA) device, an application-specific integrated circuit (ASIC), another hardware device, firmware device, or any combination thereof. As an example, any of the systems and/or devices of FIGS. 1-2, the graphs of FIG. 3, the methods of FIGS. 4-7, or a combination thereof, can be performed by one or more processors that perform object recognition. Additionally, a first portion of one of the process described in the systems and/or devices of FIGS. 1-2, the graphs of FIG. 3, the methods of FIGS. 4-7 may be combined with at least a second portion of another one of the process described in the systems and/or devices of FIGS. 1-2, the graphs of FIG. 3, the methods of FIGS. 4-7. For example, a first portion of the method 500 of FIG. 5 may be combined with a second portion of the method 700 of FIG. 7. As another example, a first portion of the method 600 of FIG. 6 may be combined with a second portion of the method 700 of FIG. 7.

Although one or more of FIGS. 1-7 may illustrate systems, apparatuses, data structures, methods, or a combination thereof, according to the teachings of the disclosure, the disclosure is not limited to these illustrated systems, apparatuses, methods, or a combination thereof. One or more functions or components of any of FIGS. 1-7 as illustrated or described herein may be combined with one or more other portions of another function or component of FIGS. 1-7. Accordingly, no single implementation described herein should be construed as limiting and implementations of the disclosure may be suitably combined without departing from the teachings of the disclosure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-2 may include processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal or base station.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized according to the present examples. Accordingly, the appended claims are intended to include within their scope such processes, machines, manufacture, compositions of matter, means, methods, or steps.

What is claimed is:

1. A method for detecting a secondary synchronization signal (SSS) index, the method comprising:
   detecting, at an electronic device, a first SSS index based on a comparison between a first power value and a first threshold, the first power value associated with a correlation power result between a received signal from a base station and a local SSS;
   determining, at the electronic device, a second threshold based on the first power value; and
   performing a comparison between a second power value and the second threshold, the second power value determined based on the received signal.

2. The method of claim 1, further comprising detecting, at the electronic device, a second SSS index based on the comparison between the second power value and the second threshold.

3. The method of claim 1, further comprising:
   determining, at the electronic device, a third threshold based on the second power value;
   performing a comparison between a third power value and the third threshold, the third power value determined based on the received signal; and
   detecting, at the electronic device, a third SSS index based on the comparison between the third power value and the third threshold.

4. The method of claim 1, further comprising:
   identifying the second power value as a spurious peak based on the comparison between the second power value and the second threshold; and
   in response to identification of the spurious peak, canceling a primary synchronization signal (PSS) component associated with a PSS index from the received signal to generate a second modified received signal.

5. The method of claim 1, further comprising:
   calculating the correlation power result between the received signal and the local SSS;
   selecting the first power value of the correlation power result; and performing the comparison between the first power value and the first threshold.

6. The method of claim 5, further comprising:
normalizing the correlation power result; and
identifying a maximum power of the normalized correlation power result, wherein the maximum power of the normalized correlation power result is selected as the first power value.

7. The method of claim 6, further comprising determining a total received signal power of the received signal, wherein the correlation power result is normalized based on the total received signal power of the received signal, and wherein the correlation power result is performed in a frequency domain.

8. The method of claim 5, further comprising, prior to calculating the correlation power result between the received signal and the local SSS:
down sampling the received signal; or
performing a transformation operation on the received signal.

9. The method of claim 5, wherein the first threshold comprises a default threshold, and wherein the first SSS index is detected based on a determination that the first power value is greater than or equal to the first threshold.

10. The method of claim 1, further comprising calculating the second threshold by multiplying the first power value by a default value.

11. The method of claim 1, further comprising:
calculating a candidate threshold based on the first power value;
comparing the candidate threshold and a default threshold; and
selecting the second threshold as a larger of the candidate threshold and the default threshold.

12. The method of claim 1, further comprising, after detection of the first SSS index:
determining a first physical cell identity (PCI) based on the first SSS index and a primary synchronization signal (PSS) index; and
cancelling a SSS component associated with the first SSS index from the received signal to generate a first modified received signal, the second power value determined based on the first modified received signal.

13. The method of claim 12, wherein cancelling the SSS component further comprising:
generating an SSS sequence for the first SSS index; and
subtracting the generated SSS sequence from the received signal to generate the first modified received signal.

14. The method of claim 13, further comprising:
calculating a second correlation power result between the first modified received signal and the local SSS; and
selecting the second power value from the second correlation power result.

15. The method of claim 12, further comprising:
after each SSS index detection operation for the PSS index, determine whether a number of SSS index operations performed for the PSS index is greater than or equal to a threshold number; and
in response to a determination that the number of SSS index operations performed for the PSS index is greater than or equal to the threshold number, cancel a PSS component associated with the PSS index from the received signal to generate a second modified received signal.

16. The method of claim 1, wherein the electronic device comprises a base station.

17. The method of claim 1, wherein the electronic device comprises a user equipment (UE).

18. An apparatus comprising:
a receiver configured to receive a signal; and
a processor coupled to the receiver and configured to execute instructions to cause the processor to:
detect a first SSS index based on a comparison between a first power value and a first threshold, the first power value associated with a correlation power result between a received signal and a local SSS;
determine a second threshold based on the first power value; and
perform a comparison between a second power value and the second threshold, the second power value determined based on the received signal.

19. The apparatus of claim 18, further comprising a memory coupled to the processor and configured to store the instructions, wherein the processor is further configured to execute the instructions to determine a first physical cell identity (PCI) based on the first SSS index and to store the first PCI at the memory, and wherein the memory is configured to store a neighbor relation table that includes the first PCI.

20. The apparatus of claim 19, wherein the processor is further configured to execute the instructions to select a second PCI that is distinct from the first PCI.

21. A non-transitory computer readable medium comprising instructions that, when executed by a processor, cause the processor to:
detect a first secondary synchronization signal (SSS) index based on a comparison between a first power value and a first threshold, the first power value associated with a correlation power result between a received signal and a local SSS;
determine a second threshold based on the first power value; and
perform a comparison between a second power value and the second threshold, the second power value determined based on the received signal.

22. The non-transitory computer readable medium of claim 21, wherein the instructions, when executed by the processor, further cause the processor to:
perform a primary synchronization signal (PSS) detection operation on the received signal to generate a first PSS detection result associated with a first PSS index;
after detection of the first SSS index, cancel a SSS component associated with the first SSS index from the received signal to generate a first modified received signal; and
after performance of a SSS detection operation on the first modified received signal, cancel a PSS component associated with the first PSS index from the received signal to generate a second modified received signal.

23. The non-transitory computer readable medium of claim 22, wherein the instructions, when executed by the processor, further cause the processor to:
determine a first physical cell identifier (PCI) based on the first PSS index and the first SSS index; and
determine a second PCI based on the first PSS index and a second SSS index determined based on the SSS detection operation performed on the first modified received signal.

24. The non-transitory computer readable medium of claim 23, wherein the instructions, when executed by the processor, further cause the processor to:

perform a PSS detection operation on the second modified received signal to generate a second PSS detection result associated with a second PSS index;

detect a third SSS index; and determine a third PCI based on the second PSS index and the third SSS index.

25. The non-transitory computer readable medium of claim 22, wherein the instructions to perform the PSS detection operation further cause the processor to:

calculate a correlation power result between the received signal and a local PSS;

select a third power value of the correlation power result between the received signal and the local PSS; and detect the first PSS index based on a comparison between the third power value and a third threshold.

26. The non-transitory computer readable medium of claim 25, wherein the correlation power result is performed in a time domain, and wherein the instructions to perform calculate the correlation power result further cause the processor to determine a timing offset between the received signal and the local PSS.

27. The non-transitory computer readable medium of claim 25, wherein the instructions to perform the PSS detection operation further cause the processor to:

normalize the correlation power result; and select the third power value as a maximum power of the normalized correlation power result.

28. The non-transitory computer readable medium of claim 27, wherein the correlation power result is normalized based on a total received signal power of the received signal, and wherein the instructions to perform calculate the correlation power result further cause the processor to down sample the received signal to generate a down sampled version of the received signal, the correlation power result calculated based on the down sampled version of the received signal and the local PSS.

* * * * *

UNITED STATES PATENT AND TRADEMARK OFFICE
CERTIFICATE OF CORRECTION

PATENT NO. : 10,334,516 B1
APPLICATION NO. : 15/920026
DATED : June 25, 2019
INVENTOR(S) : Kong Chau Eric Tsang et al.

Page 1 of 1

It is certified that error appears in the above-identified patent and that said Letters Patent is hereby corrected as shown below:

In the Specification

At Column 9, Line number 26, delete "$ICDF_{F(I,L)}$" and replace with --$ICDF_{F(1,L)}$--.
At Column 10, Line number 1, delete "a and f" and replace with --$\alpha$ and $\beta$--.

Signed and Sealed this
Twentieth Day of August, 2019

Andrei Iancu
*Director of the United States Patent and Trademark Office*